United States Patent
Chuang

(10) Patent No.: US 9,002,316 B2
(45) Date of Patent: Apr. 7, 2015

(54) METHOD OF CELL RESELECTION FOR A MOBILE COMMUNICATION SYSTEM AND RELATED MOBILE DEVICE

(75) Inventor: Ming-Dao Chuang, New Taipei (TW)

(73) Assignee: Acer Incorporated, Xizhi Dist., New Taipei (TW)

( * ) Notice: Subject to any disclaimer, the term of this patent is extended or adjusted under 35 U.S.C. 154(b) by 90 days.

(21) Appl. No.: 13/415,773

(22) Filed: Mar. 8, 2012

(65) Prior Publication Data

US 2013/0157608 A1    Jun. 20, 2013

(30) Foreign Application Priority Data

Dec. 16, 2011    (TW) .............................. 100146847 A

(51) Int. Cl.
| | |
|---|---|
| H04M 11/04 | (2006.01) |
| H04W 48/20 | (2009.01) |
| H04W 48/02 | (2009.01) |
| H04W 76/00 | (2009.01) |

(52) U.S. Cl.
CPC ............. *H04W 48/20* (2013.01); *H04W 48/02* (2013.01); *H04W 76/007* (2013.01)

(58) Field of Classification Search
USPC ................. 455/404.1, 434–437; 370/241, 331
See application file for complete search history.

(56) References Cited

U.S. PATENT DOCUMENTS

| | | | |
|---|---|---|---|
| 6,792,284 B1* | 9/2004 | Dalsgaard et al. ............. 455/525 |
| 2005/0250529 A1* | 11/2005 | Funnell et al. ................ 455/525 |
| 2006/0035662 A1* | 2/2006 | Jeong et al. .................... 455/525 |
| 2007/0142049 A1* | 6/2007 | Chae et al. ................. 455/435.2 |
| 2008/0200146 A1 | 8/2008 | Wang |
| 2008/0293419 A1* | 11/2008 | Somasundaram et al. ..... 455/437 |
| 2009/0088154 A1* | 4/2009 | Umatt et al. .................. 455/434 |
| 2009/0298459 A1* | 12/2009 | Saini et al. ................. 455/404.1 |
| 2010/0112976 A1* | 5/2010 | Turina ........................ 455/404.1 |
| 2010/0255807 A1* | 10/2010 | Umatt et al. ............... 455/404.1 |
| 2010/0279648 A1* | 11/2010 | Song et al. ................. 455/404.1 |
| 2011/0141910 A1* | 6/2011 | Rosik ............................ 370/241 |
| 2011/0171924 A1* | 7/2011 | Faccin et al. .............. 455/404.1 |
| 2011/0171925 A1* | 7/2011 | Faccin et al. .............. 455/404.1 |
| 2011/0171926 A1* | 7/2011 | Faccin et al. .............. 455/404.1 |
| 2012/0057568 A1* | 3/2012 | Lim et al. ...................... 370/331 |
| 2012/0196603 A1* | 8/2012 | Mochizuki et al. ........... 455/436 |
| 2012/0324100 A1* | 12/2012 | Tomici et al. ................. 709/224 |

FOREIGN PATENT DOCUMENTS

| | | |
|---|---|---|
| CN | 101816208 A | 8/2010 |
| EP | 1 626 605 A1 | 2/2006 |
| WO | 2010024111 A1 | 3/2010 |

OTHER PUBLICATIONS

3rd Generation Partnership Project; Technical Specification Group Radio Access Network; User Equipment (UE) procedures in idle mode and procedures for cell reselection in connected mode (Release 10), 3GPP TS 25.304, Sep. 2011, pp. 1-52, V10.2.0, XP050554162, France.

* cited by examiner

*Primary Examiner* — Nathan Taylor
(74) *Attorney, Agent, or Firm* — Winston Hsu; Scott Margo

(57) ABSTRACT

A method of cell reselection for a mobile communication system comprises determining whether a mobile device in the mobile communication system is capable of initiating an emergency call through the second cell when a network of the mobile communication system restricts the mobile device from accessing a first cell, and the mobile device performs a first cell reselection procedure to switch the first cell to the second cell, so as to generate a first determination result, and determining whether the mobile device camps on the second cell according to the first determination result.

16 Claims, 4 Drawing Sheets

METHOD OF CELL RESELECTION FOR A MOBILE COMMUNICATION SYSTEM AND RELATED MOBILE DEVICE

BACKGROUND OF THE INVENTION

1. Field of the Invention

The present invention relates to a method of cell reselection for a mobile communication system and related mobile device, and more particularly, to a method of cell reselection for a mobile communication system and related mobile device that can initiate an emergency call immediately.

2. Description of the Prior Art

A Universal Mobile Telecommunications System (UMTS) is the 3rd generation mobile communication technology, which is generally composed of a Universal Terrestrial Radio Access Network (UTRAN) and a plurality of User Equipments (UEs). A Universal Terrestrial Radio Access Network (UTRAN) includes a Core Network, which is composed of a plurality of Node Bs and a plurality of base station controllers (or Radio Network Controllers, RNCs).

In the UMTS, a UE in idle mode establishes a Radio Resource Control (RRC) connection for signaling or data transmission. The UE sends an RRC connection request message including an RRC connection establishment cause to a Node B to request to establish an RRC connection. The Node B uses the RRC connection establishment cause to prioritize the RRC connection request from the UE, e.g. in high load situations. Therefore, the UE has to include the correct RRC connection establishment cause for the Node B to prioritize the RRC connection establishment. RRC connection establishment causes include emergency call, high priority access, Mobile Terminating (MT) access, Mobile Originating (MO) signaling and MO data.

For emergency calls, according to the specification developed by the 3rd Generation Partnership Project, whether or not a user can initiate an emergency call is related to access classes. For example, Access Class 10 is a control bit related to emergency calls; Access Classes 0 to 9 are normal access classes, and can be viewed as 10 mobile groups, where every mobile device is randomly allocated to one of the normal access classes; Access Classes 11 to 15 are special access classes, which are allocated to specific high-priority users as follows:

Access Class 11: For PLMN use;
Access Class 12: Security services;
Access Class 13: Public utilities (e.g. water/gas suppliers);
Access Class 14: Emergency services; and
Access Class 15: PLMN staff.

The access classes (i.e. Access Classes 0 to 15) are stored in the Subscriber Identity Module (SIM) card.

If a mobile device is allocated to one of the normal access classes or lacks an International Mobile Subscriber Identity (IMSI), and Access Class 10 is barred, or the mobile device is allocated to one or more access classes of Access Classes 11 to 15, such allocated access class (es) and Access Class 10 being barred, the mobile device will be restricted from initiating an emergency call. Otherwise, the mobile device may initiate an emergency call.

The network can restrict the mobile device from access due to a specific factor, including network congestion, that may invoke access class related access restriction. When the network restricts the mobile device from accessing a cell camped on by the mobile device, the cell broadcasts system information related to access class barring. The mobile device checks the system information broadcasted by the cell when attempting to access the network. When checking that the mobile device can not access the cell (e.g. initiate an emergency call), the mobile device proceeds to perform a cell reselection procedure to select a new cell. Known methods for performing the cell reselection procedure are described in detail in 3GPP TS 25.304, developed by the 3GPP, and are not further described here. Notably, in this situation, the mobile device ignores access classes checking when selecting a new cell.

After finding and camping on a new cell, the mobile device checks system information first when attempting to initiate an emergency call, then transmits an RRC connection request message to RNC of the network to request RRC connection establishment. However, if the new cell does not allow the mobile device to initiate an emergency call, that is, under Access Class being barred, the mobile device does not contain an IMSI, or one or more special access classes of Access Classes 11 to 15 are barred, the mobile device will be incapable of initiating an emergency call when checking the system information. In this situation, the mobile device will perform the cell reselection procedure again to search for another cell capable of providing emergency call service to the mobile device for the mobile device to camp on. The mobile device performs an RRC connection procedure after camping on the selected cell.

From the above, the mobile device might be incapable of initiating an emergency call after being restricted from accessing an originally camped cell by the network to select a new cell to camp on. In the case of threats to life or property, life or property might be lost if the mobile device is incapable of initiating an emergency call immediately.

SUMMARY OF THE INVENTION

It is therefore a primary objective of the present invention to provide a method of cell reselection for a mobile communication system and related mobile device.

The present invention discloses a method of cell reselection for a mobile communication system, comprising determining whether a mobile device in the mobile communication system is capable of initiating an emergency call through a second cell according to a plurality of access classes when a network of the mobile communication system restricts the mobile device from accessing a first cell, and the mobile device performs a first cell reselection procedure to switch from the first cell to the second cell, so as to generate a first determination result; and determining whether the mobile device camps on the second cell according to the first determination result.

The present invention further discloses a mobile device for a mobile communication system, used for performing a cell reselection process, the mobile device comprising means for determining whether a mobile device in the mobile communication system is capable of initiating an emergency call through a second cell according to a plurality of access classes when a network of the mobile communication system restricts the mobile device from accessing a first cell, and the mobile device performs a first cell reselection procedure to switch from the first cell to the second cell, so as to generate a first determination result; and means for determining whether the mobile device camps on the second cell according to the first determination result.

These and other objectives of the present invention will no doubt become obvious to those of ordinary skill in the art after reading the following detailed description of the preferred embodiment that is illustrated in the various figures and drawings.

DETAILED DESCRIPTION

The main spirit of the present invention is that, when a network restricts a mobile device from accessing a camped cell, the mobile device can initiate an emergency call through a new cell immediately after initiating a cell reselection procedure to select, then camp on, the new cell.

Figure 1:
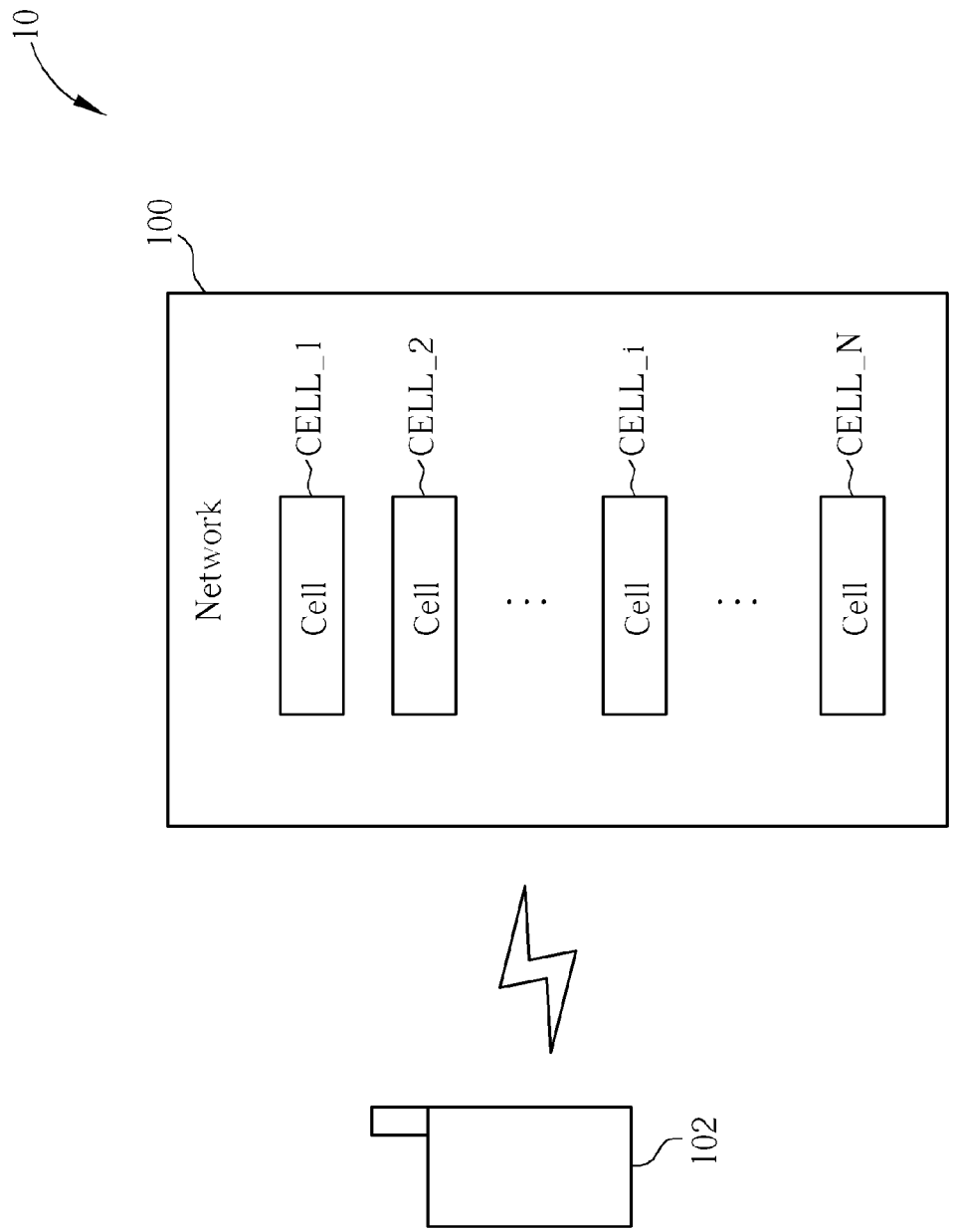
FIG. 1 is a schematic diagram of a mobile communication system according to an embodiment of the present invention.
Figure 2:
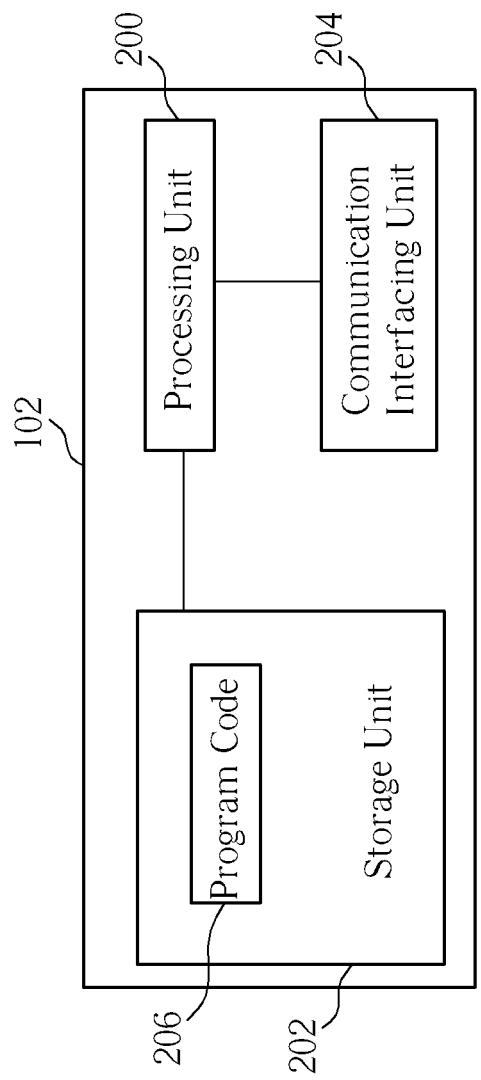
FIG. 2 is a schematic diagram of a mobile device according to an embodiment of the present invention.

Please refer to FIG. 1, which is a schematic diagram of a mobile communication system 10 according to an embodiment of the present invention. The mobile communication system 10 can be a Universal Mobile Telecommunications System (UMTS) or any other network system, and in the UMTS, the network 100 can be a Universal Terrestrial Radio Access Network (UTRAN), and the mobile devices 102 are user equipment (UE), which can be a device such as mobile phone, computer system, etc. The network 100 and the mobile device 102 may be viewed as a transmitter or receiver according to transmission direction. For example, for uplink (UL), the mobile device 102 is the transmitter and the network 100 is the receiver, and for downlink (DL), the network 100 is the transmitter and the mobile device 102 is the receiver. The network 100 includes cells CELL_1-CELL_n which are in coverage ranges of various base stations and can be seen as interfaces between the mobile device 102 and network 100. When the mobile device 102 attempts to access the network, the mobile device 102 must camp on a cell among the cells CELL_1-CELL_n Please refer to FIG. 2, which is a schematic diagram of a mobile device 102 according to an embodiment of the present invention. The mobile device 102 includes a processing unit 200, a storage unit 202 and a communication interfacing unit 204. The processing unit 200 can be a microprocessor or an application-specific integrated circuit (ASIC). The storage unit 202 can be any data storage device for storing a program code 206 and reading/executing the program code 206 via the processing unit 200. Examples of the storage unit 202 include a subscriber identity module (SIM), read-only memory (ROM), random-access memory (RAM), CD-ROMs, magnetic tapes, floppy disks, optical data storage devices, and carrier waves (such as data transmission through the Internet), which is not limited hereinafter. The communication interfacing unit 204 is preferably a radio transceiver for wirelessly communicating with the network 100 according to processing results from the processing unit 200.

Figure 3:
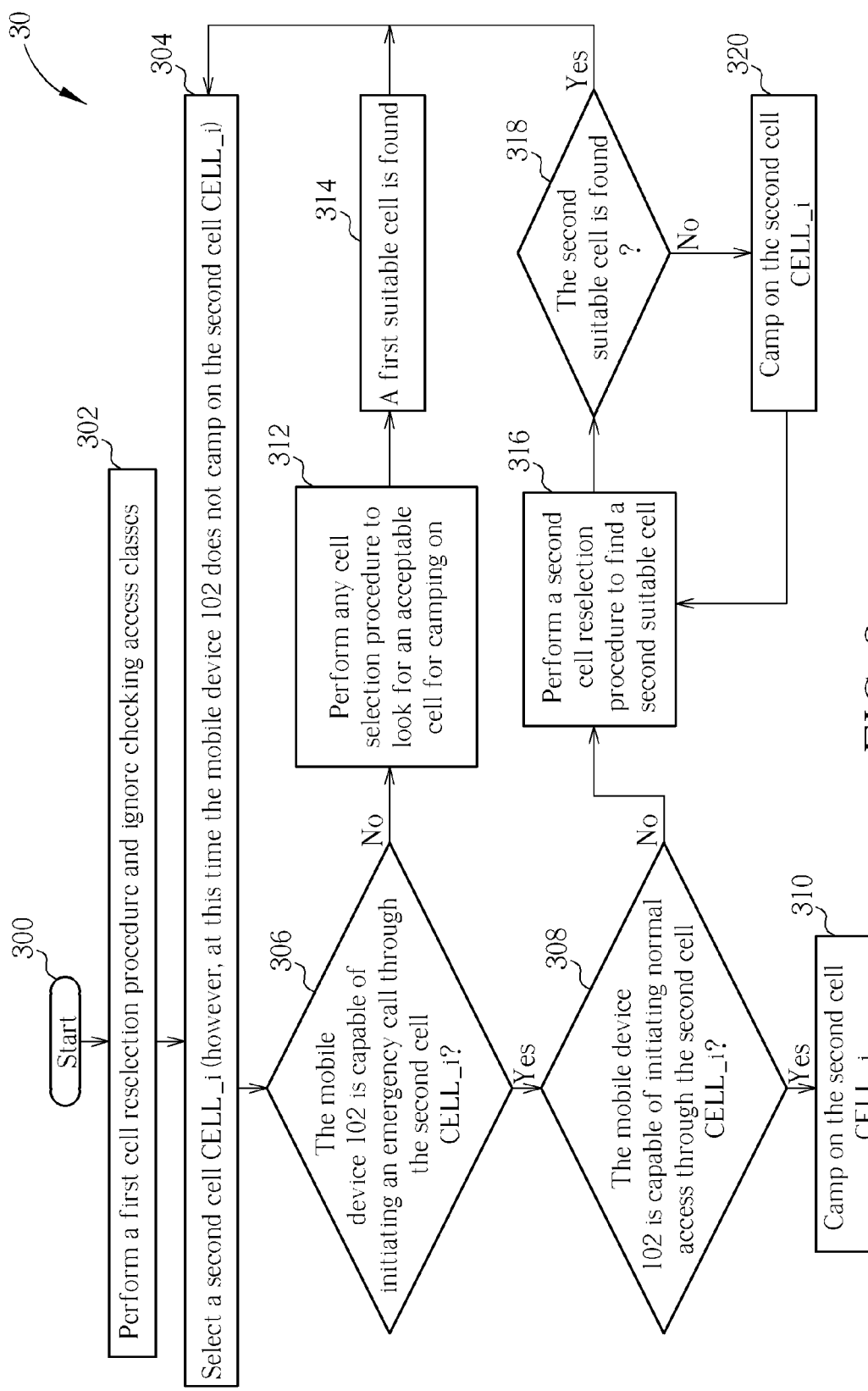
FIG. 3 is a flowchart diagram of a cell reselection process according to another embodiment of the present invention.

Please refer to FIG. 3, which is a flowchart diagram of a cell reselection process 30 according to an embodiment of the present invention. The cell reselection process 30 is an operating process performed when the network 100 restricts the mobile device 102 from accessing a first cell (e.g. CELL_1) originally camped on by the mobile device 102, and the mobile device 102 needs to perform a cell reselection procedure in order to switch from the first cell to a second cell (e.g. CELL_i). The cell reselection process 30 can be compiled to a program code 206 including the following steps:

Step 300: Start.

Step 302: Perform a first cell reselection procedure and ignore checking access classes.

Step 304: Select a second cell CELL_i (however, at this time the mobile device 102 does not camp on the second cell CELL_i).

Step 306: Determine whether the mobile device 102 is capable of initiating an emergency call through the second cell CELL_i. If yes, go to Step 308; otherwise, go to Step 312.

Step 308: Determine whether the mobile device 102 is capable of initiating normal access through the second cell CELL_i. If yes, go to Step 310; otherwise, go to Step 316.

Step 310: Camp on the second cell CELL_i.

Step 312: Perform any cell selection procedure to look for an acceptable cell for camping on.

Step 314: A first suitable cell is found.

Step 316: Perform a second cell reselection procedure to find a second suitable cell.

Step 318: Verify if the second suitable cell is found. If yes, go to Step 304; otherwise, go to Step 320.

Step 320: Camp on the second cell CELL_i.

The cell reselection process 30 starts when the network 100 restricts the mobile device 102 from accessing the first cell CELL_1. The first cell CELL_1 broadcasts system information related to access class barring, for notifying the mobile device 102 that the network restricts the mobile device 102 from accessing the first cell CELL_1. After receiving such system information, the mobile device 102 performs a first cell reselection procedure to select a second cell CELL_i. The method of cell reselection procedure is described in detail in 3GPP TS 25.304, so description of the cell reselection procedure is not given herein. Notably, the mobile device 102 ignores access class checking when selecting the second cell CELL_i.

According to the cell reselection process 30, the mobile device 102 does not camp on the second cell CELL_i when the second cell CELL_i is selected after the first cell reselection procedure. Instead, the mobile device 102 receives system information broadcasted by the second cell CELL_i and determines whether the mobile device 102 is capable of initiating an emergency call through the second cell CELL_i according to a plurality of access classes in the system information. If the determining result indicates the mobile device 102 can initiate an emergency call through the second cell CELL_i, the mobile device 102 further determines whether the mobile device 102 can initiate normal access through the second cell according to the plurality of access classes. Note that determining whether an emergency call and normal access can be initiated according to access classes is the same as in the known art, and determining method is described in the description of the prior art, so the detailed description is omitted herein. However, in the known art, when the network restricts the mobile device from access, the mobile device starts performing a cell reselection process (i.e. the first cell reselection process) but ignores an access class check. In comparison, in the present invention, after performing a cell reselection process due to restriction from access by the network, the mobile device further determines whether the mobile device can initiate an emergency call and normal access through the second cell according to the access classes.

In a situation in which the mobile device 102 can initiate an emergency call and normal access through the second cell CELL_i, the mobile device 102 camps on the second cell CELL_i. In one situation in which the mobile device 102 can not initiate an emergency call through the second cell CELL_i, the mobile device 102 performs an any cell selection procedure to find an acceptable cell to camp on. The acceptable cell is a cell on which allows mobile devices to camp for accessing limited services, including an emergency call service. The method of cell reselection procedure is described in detail in 3GPP TS 25.304, so the description of the cell reselection procedure is not given herein. After camping on the acceptable cell, the mobile device 102 continues searching for a first suitable cell. The suitable cell is a cell which allows mobile devices to camp thereon for accessing normal services, and generally mobile devices can initiate normal access through the suitable cell. After a first suitable cell is found, the mobile device 102 leaves the acceptable cell and selects the first suitable cell. At this time, the mobile device 102 does not camp on the first suitable cell; instead, the mobile device repeats access class checking to determine whether to camp on the first suitable cell. In a situation in which the mobile device 102 can initiate an emergency call but not normal access through the second cell CELL_i, the mobile device 102 performs a second cell reselection procedure to search for a second suitable cell. After a second suitable cell is found, the mobile device 102 selects the second suitable cell. At this time the mobile device 102 does not camp on the second suitable cell. Instead, the mobile device 102 performs access class checking to determine whether to camp on the second suitable cell. If no second suitable cell is found, the mobile device 102 camps on the second cell. Notably, in this situation, the mobile device 102 can only initiate an emergency call without normal access through the second cell CELL_i. If the mobile device 102 wants to initiate normal access, the mobile device 102 performs the second cell reselection procedure again for selecting another suitable cell.

Briefly, in the cell reselection process 30, the mobile device 102 determines whether the mobile device 102 can initiate an emergency call through the second cell CELL_i according to the plurality of access classes in the system information broadcasted by the second cell CELL_i, and then further determines whether the mobile device 102 can initiate normal access through the second cell CELL_i according to the plurality of access classes in the system information broadcasted by the second cell CELL_i. However, if a mobile device being able to camp on a cell for emergency call service is the only requirement, steps of determining whether the mobile device can initiate normal access through the selected cell can be omitted.

Figure 4:
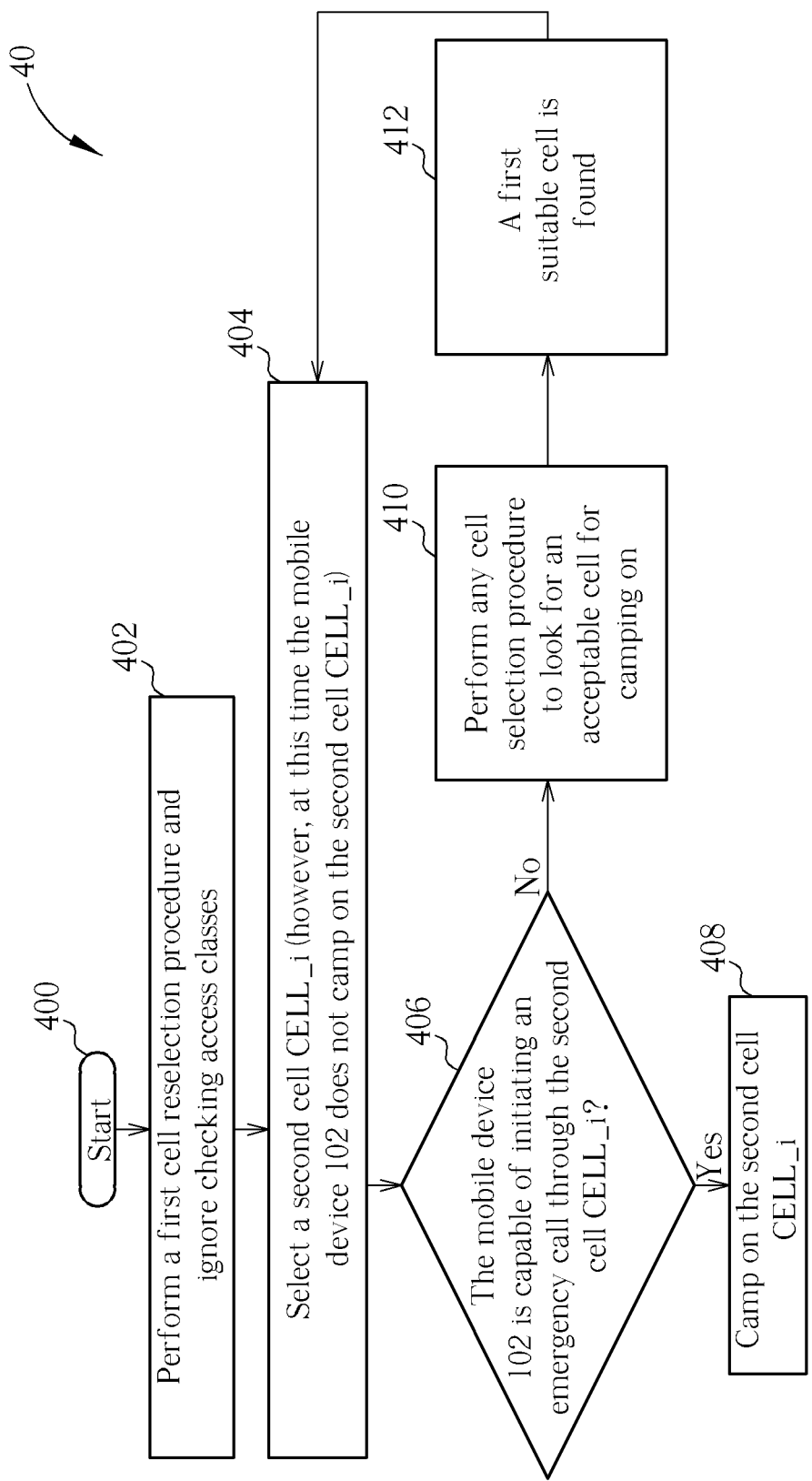
FIG. 4 is a flowchart diagram of a cell reselection process according to an embodiment of the present invention.

For the above reason, the present invention further provides a simplified process of the cell reselection process 30. FIG. 4 is a cell reselection process 40 according to another embodiment of the present invention. The cell reselection process 40 is a simplified process of the cell reselection process 30 shown in FIG. 3, which here takes the mobile device 104 switching from the first cell CELL_1 to the second cell CELL_i for example to describe the cell reselection process 40. The cell reselection process can be compiled into the program code 206, and includes the following steps:

Step 400: Start.

Step 402: Perform a first cell reselection procedure and ignore checking access classes.

Step 404: Select a second cell CELL_i (however, at this time the mobile device 102 does not camp on the second cell CELL_i).

Step 406: Determine whether the mobile device 102 is capable of initiating an emergency call through the second cell CELL_i. If yes, go to Step 408; otherwise, go to Step 410.

Step 408: Camp on the second cell CELL_i.

Step 410: Perform any cell selection procedure to look for an acceptable cell for camping on.

Step 412: A first suitable cell is found.

According to the cell reselection process 40, the mobile device 102 does not camp on the second cell CELL_i when the second cell CELL_i is selected after the first cell reselection procedure. Instead, the mobile device 102 receives system information broadcasted by the second cell and determines whether the mobile device 102 is capable of initiating an emergency call through the second cell CELL_i according to a plurality of access classes in the system information. If the determining result indicates the mobile device 102 can initiate an emergency call through the second cell, the mobile device 102 camps on the second cell CELL_i. If the mobile device 102 can not initiate an emergency call through the second cell CELL_i, the mobile device 102 performs an any cell selection procedure to find an acceptable cell to camp on. After camping on the acceptable cell, the mobile device 102 continues searching for a first suitable cell. After a first suitable cell is found, the mobile device 102 leaves the acceptable cell and selects the first suitable cell. At this time, the mobile device 102 does not camp on the first suitable cell. Instead, the mobile device 102 repeats access class checking to determine whether to camp on the first suitable cell.

The primary objective of the cell reselection process 30 and the cell reselection process 40 is to ensure that a mobile device can initiate an emergency call through a cell after camping on a new cell. By such processes, the mobile device can definitely initiate an emergency call through the new cell after camping on the new cell, providing more assurance.

In the known art, the mobile device might suffer incapability of initiating an emergency call after being restricted from accessing an originally camped cell by the network to select a new cell to camp on. In comparison, in the present invention, the mobile device determines that the mobile device can initiate an emergency call according to the access classes broadcasted by a new cell during a process where the network restricts the mobile device from accessing a camped cell to start a cell reselection procedure for selecting the new cell, in order to camp on the new cell.

In conclusion, when a network restricts a mobile device from accessing the camped cell, the cell reselection method provided by the present invention ensures that the mobile device can initiate an emergency call through the new cell after camping on a new cell. In an urgent situation, if an emergency call can be initiated immediately, the notification and handling time of the urgent situation can be earlier, so as to provide more assurance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of cell reselection for a mobile communication system, comprising:
   checking a plurality of access classes to determine whether a mobile device in the mobile communication system is capable of initiating an emergency call through a suitable cell and to generate a first determination result when the mobile device performs a first cell reselection procedure to switch from a first cell to the suitable cell due to restriction from accessing the first cell, wherein the suitable cell is able to provide a normal service;
   checking the plurality of access classes to determine whether the mobile device is capable of initiating normal access through the suitable cell and to generate a second determination result when the first determination result indicates that the mobile device is capable of initiating the emergency call through the suitable cell; and
   determining whether the mobile device camps on the suitable cell according to the first determination result.

2. The method of claim 1, wherein the network restricts the mobile device from accessing the first cell due to network congestion.

3. The method of claim 1, wherein determining whether the mobile device camps on the suitable cell according to the first determination result comprises:

the mobile device entering an any cell selection procedure to find an acceptable cell to camp on when the first determination result indicates that the mobile device is incapable of initiating the emergency call through the suitable cell.

4. The method of claim 3, further comprising:

the mobile device proceeding to find an another suitable cell after camping on the acceptable cell.

5. The method of claim 1, wherein determining whether the mobile device camps on the suitable cell according to the first determination result comprises:

the mobile device camping on the suitable cell when the first determination result indicates that the mobile device is capable of initiating the emergency call through the suitable cell.

6. The method of claim 1, wherein the step of determining whether the mobile device camps on the suitable cell according to the first determination result comprises:

the mobile device camping on the suitable cell when the second determination result indicates that the mobile device is capable of initiating the normal access through the suitable cell.

7. The method of claim 1, wherein the step of determining whether the mobile device camps on the suitable cell according to the first determination result comprises:

the mobile device performing a second cell reselection procedure to find a further suitable cell when the second determination result indicates that the mobile device is incapable of initiating the normal access through the suitable cell.

8. A mobile device for a mobile communication system, used for performing a cell reselection process, the mobile device comprising:

a storage unit for storing a program code corresponding to a process; and a processing unit coupled to the computer readable recording medium, for processing the program code to execute the process;

wherein the process comprises:

checking a plurality of access classes to determine whether a mobile device in the mobile communication system is capable of initiating an emergency call through a suitable cell and to generate a first determination result when the mobile device performs a first cell reselection procedure to switch from a first cell to the suitable cell due to restriction from accessing the first cell, wherein the suitable cell is able to provide a normal service checking the plurality of access classes to determine whether the mobile device is capable of initiating normal access through the suitable cell and to generate a second determination result when the first determination result indicates that the mobile device is capable of initiating the emergency call through the suitable cell; and determining whether the mobile device camps on the suitable cell according to the first determination result.

9. The method of claim 7, further comprising:

the mobile device camping on the suitable cell when no further suitable cell is found for the mobile device to camp on.

10. The mobile device of claim 8, wherein the network restricts the mobile device from accessing the first cell due to network congestion.

11. The mobile device of claim 8, wherein the step of determining whether the mobile device camps on the suitable cell according to the first determination result comprises:

the mobile device entering an any cell selection procedure to find an acceptable call to camp on when the first determination result indicates that the mobile device is incapable of initiating the emergency call through the suitable cell.

12. The mobile device of claim 11, wherein the process further comprises:

the mobile device proceeding to find an another suitable cell after camping on the acceptable cell.

13. The mobile device of claim 8, wherein the step of determining whether the mobile device camps on the suitable cell according to the first determination result comprises:

the mobile device camping on the suitable cell when the first determination result indicates that the mobile device is capable of initiating the emergency call through the suitable cell.

14. The mobile device of claim 8, wherein the step of determining whether the mobile device camps on the suitable cell according to the first determination result comprises:

the mobile device camping on the suitable cell when the second determination result indicates that the mobile device is capable of initiating the normal access through the suitable cell.

15. The mobile device of claim 8, wherein the step of determining whether the mobile device camps on the suitable cell according to the first determination result comprises:

the mobile device performing a second cell reselection procedure to find a further suitable cell when the second determination result indicates that the mobile device is incapable of initiating the normal access through the suitable cell.

16. The mobile device of claim 15, wherein the process further comprises the mobile device camping on the suitable cell when no further suitable cell is found for the mobile device to camp on.

* * * * *